2,987,942
AUTOMATIC CONTROL MECHANISM
Zbigniew J. Jania, Detroit, Mich., assignor to Ford Motor Company, Dearborn, Mich., a corporation of Delaware
Filed Mar. 21, 1957, Ser. No. 647,661
15 Claims. (Cl. 74—752)

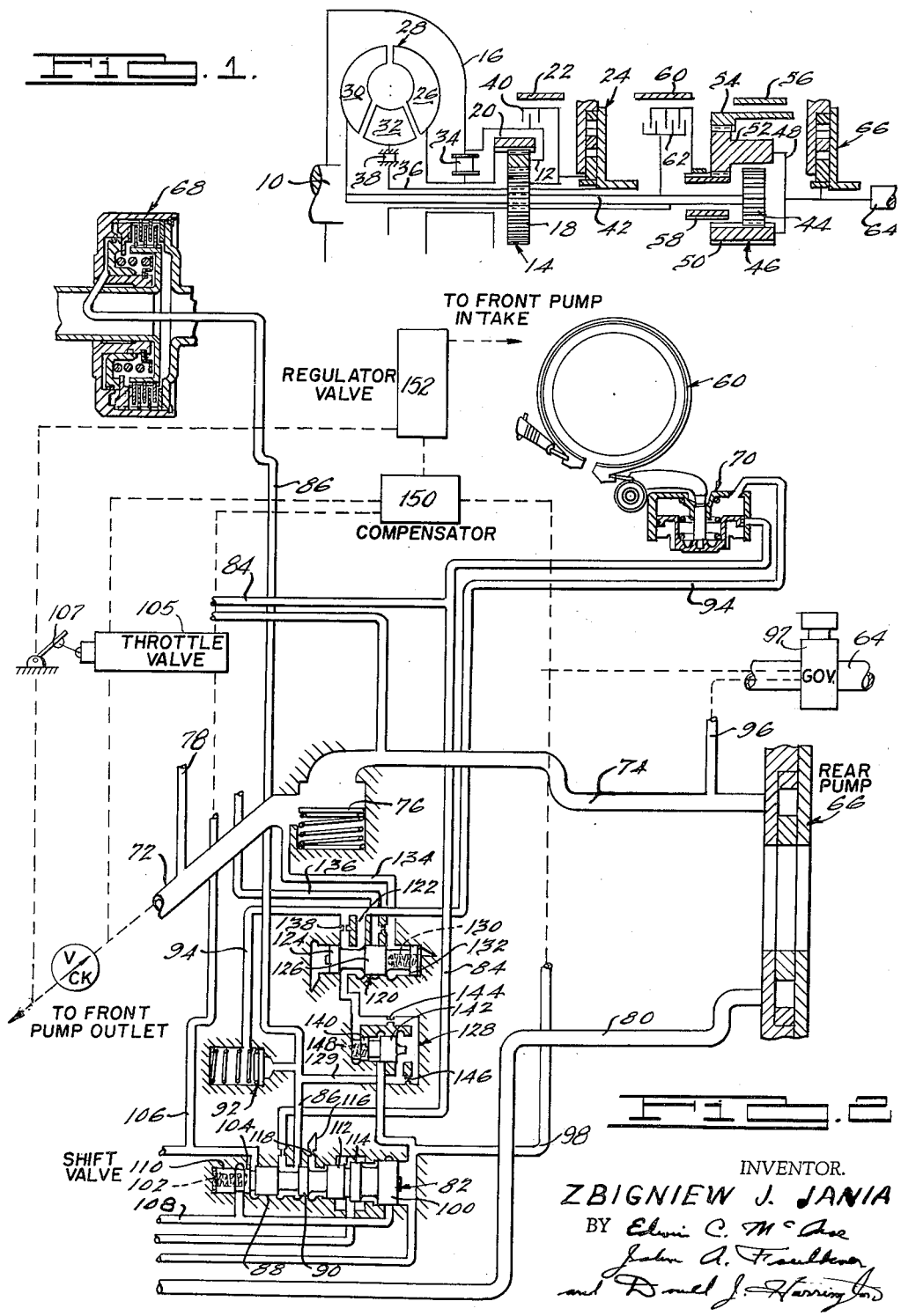

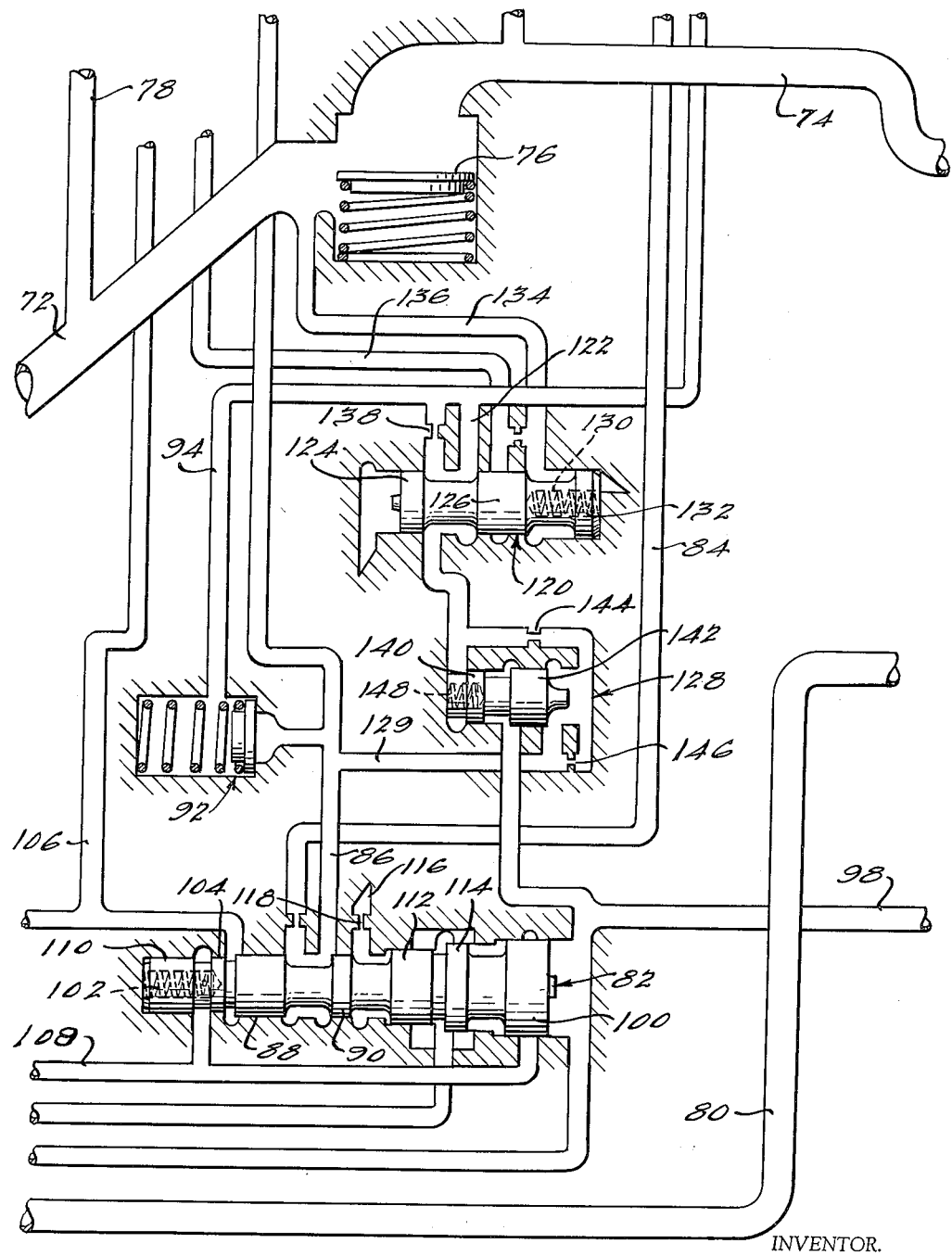

My invention relates generally to automatic control mechanisms and more particularly to automatic means for controlling the operation of a multiple speed, power transmission mechanism. My invention finds particular utility in a control system for an automatic power transmission mechanism for automotive vehicles.

I am aware of a variety of transmission mechanisms with which the improved control system of my invention may be used, but for the purpose of describing a particular operating environment for my invention, I have herein disclosed an automotive type, three-speed, automatic power transmission employing a hydraulic torque converter unit and planetary gear reduction units cooperating therewith to form three power delivery paths of varying torque multiplication ratios. The various elements of the planetary gear units may be selectively clutched together or braked to produce the various multiplication ratios and the clutches and brakes employed to accomplish this form a portion of the automatic controls of which my instant invention forms a part.

The control system includes an engine torque sensing portion and a vericle speed sensing portion, the torque and speed signals respectively received from these portions of the control system being utilized by the various control pressure distributing valves in the system during operation of the control clutches and brakes to obtain a desired shift sequence as determined by the operating requirements.

The transmission structure herein disclosed is characterized by a friction brake for braking one element of one planetary gear unit thus effecting a relatively high torque multiplication ratio in the power delivery path established by the same. Two planetary gear elements may be clutched together by the aforementioned control clutch to establish a different power delivery path with a reduced torque multiplication ratio. Both the control clutch and the control brake include a fluid pressure operated servo for energizing the same and a positive displacement pump may be employed for establishing a control pressure for energizing the servos. In the instant embodiment, a pair of positive displacement pumps are provided in the control system for establishing such a control pressure, one pump being powered by the vehicle engine and the other being directly coupled to the transmission power output driven member. By preference, the servo for the control brake is comprised of a pair of fluid working chambers situated on opposed sides of a brake energizing piston and the control clutch comprises a single acting piston. Control pressure may be applied to one side of the clutch piston to energize the clutch and a suitable spring may be used for urging the clutch piston toward an inoperative position. By way of contrast, the control brake is de-energized when both working chambers thereof are energized and it is energized when one working chamber is exhausted.

The control system includes conduit structure connecting the above described fluid pressure source with the control clutch and brake and a suitable shift valve may be provided for selectively distributing fluid pressure to either the clutch or the brake as determined by the operating requirements, said shift valve defining a part of the conduit structure. Engine torque sensitive pressure is applied to one portion of the shift valve for urging the same toward one operating position and a vehicle speed responsive pressure is applied to an opposed portion of the shift valve for establishing a pressure force which balances corresponding oppositely directed forces established by the engine torque sensitive pressure and by a suitable valve spring. When the shift valve forces established by the vehicle speed sensitive pressure exceed the oppositely directed valve actuating forces the shift will assume one operating position thereby causing control pressure to be directed to the control clutch and to the release side of the control brake thus causing the transmission to shift to a speed reduction ratio of relatively reduced magnitude. By preference, the apply side of the brake servo piston continuously communicates with the control pressure source and the brake normally assumes an energized condition whenever control pressure from the opposed, release side of the piston is exhausted. However, when control pressure is applied to the release side of the brake servo piston the resulting pressure force overcomes the apply pressure force to effect a disengagement of the associated brake.

When the ratio of the torque sensitive pressure to the vehicle speed sensitive pressure increases to a value which is of sufficient magnitude to cause the shift valve to move in the opposite direction, the working chamber of the control clutch becomes exhausted and the working chamber on the release side of the control brake piston is simultaneously exhausted thereby allowing the control brake to become energized. The resulting decreased multiplication ratio following such a downshift necessitates an increase in engine speed and this in turn requires a shift time interval of predetermined magnitude. It thus becomes necessary to retard the engagement of the control brake following a shift of the shift valve to a downshift position. I have, therefore, interposed in the control system a forced downshift control valve capable of regulating the rate of discharge of control pressure from the release side of the control brake and this in turn regulates the rate at which the control brake is applied. Since the percent of engine speed change accompanying such a downshift is constant regardless of the vehicle speed, the actual engine speed differential which takes place during a downshift at low vehicle speeds is substantially less than the engine speed differential which takes place during a downshift at relatively high vehicle speeds. It is thus necessary to delay the rate at which the control pressure is exhausted from the release side of the control brake servo during a downshift at high vehicle speeds and to provide for an increased rate of discharge of control pressure from the control brake servo during downshifts at relatively low vehicle speeds. The improved control mechanism of our instant invention accomplishes such a variable delay action.

The above-mentioned downshift can be characterized as a forced downshift since it takes place when the torque demands of the engine are suddenly increased when it is desired to accelerate the vehicle following a period of operation under steady state conditions. However, it is also possible to effect a downshift following a period during which the vehicle is coasting under its own momentum. It is desirable in such instances to delay the application of the control brake in order to allow the clutch to fully disengage and to cushion the application of the brake. This function is accomplished in the improved control system of my instant invention by means of a coast downshift control valve. If the engine throttle is moved to an advanced setting following such a coast downshift, the coast downshift control valve is adapted to respond to the resulting increase in the torque demand responsive pressure and to move to a position which permits immediate disengagement of the control brake and an immediate application of the control clutch. This latter position corresponds to the position which the coast downshift control valve normally assumes under normal driving conditions. However, under coasting conditions, the torque demand responsive pressure is reduced to its minimum value and the coast downshift control valve immediately assumes a position which increases the rate of release of working fluid from the release side of the control brake.

In the preferred embodiment of my invention herein disclosed, the working chambers for the clutch and the brake are exhausted through a common exhaust port which in turn is controlled by a portion of the shift valve. When a forced downshift occurs at a low vehicle speed, the restriction provided by the forced downshift control valve as above described is removed from the system. Under these conditions the time interval required to de-energize the clutch will normally be substantially less than the time interval required to fully engage the brake. Therefore, in order to avoid a condition where both the clutch and the brake are de-energized simultaneously, which in turn would cause the engine to "run away," I have introduced a precalibrated orifice in a common exhaust passage for the clutch and brake. When a downshift occurs fluid will simultaneously be exhausted from the working chamber of the clutch and from the release side of the brake through this precalibrated orifice. The volume of fluid passing through the orifice is such that a pressure buildup will be maintained in the clutch working chamber for a considerable time interval following a shifting movement of the shift valve. During such low speed operation the actual engine speed differential during a forced downshift is relatively small and the time interval required to accelerate the engine from the lower limit to the upper limit is thus substantially less under these conditions than the time normally required to disengage the control brake.

It is thus apparent that the precalibrated exhaust orifice and the forced downshift control valve functionally cooperate during such low speed operation to speed up the disengagement of the brake and to simultaneously delay release of the clutch. By way of contrast, the forced downshift control valve and the precalibrated exhaust orifice cooperate during high speed operation to delay the application of the control brake while simultaneously increasing the rate of disengagement of the control clutch thereby providing an increased time interval for the engine to accelerate from the lower limit to the higher limit, the actual engine speed differential which is necessary being greater in this latter instance than in the case of low speed operation.

The provision of an improved control system of the type above described being a principal object of my invention, it is a further object of my invention to provide a control system for a multiple speed, automatic power transmission mechanism which is capable of regulating a shift from one operating ratio to another with a maximum degree of smoothness.

It is a further object of my invention to provide a control system for an automatic transmission having clutch and brake elements wherein the clutch and brake elements are sequentially energized and de-energized in timed, synchronized relationship.

It is a further object to provide a control system of the type above set forth and which is capable of regulating the duration of the shift interval from one speed reduction ratio to another by appropriately delaying the engagement or disengagement of the clutch and brake elements as appropriate in accordance with the driven speed of the power output member.

It is a further object of my invention to provide a control system for a multiple speed, automatic power transmission for delivering power from an engine to a driven member, said transmission including a first and a second fluid operated servo for respectively conditioning the transmission for a relatively high and a relatively low gear multiplication ratio, wherein means are provided for automatically regulating the time interval required to accomplish a shift from one gear reduction ratio to a higher torque multiplication ratio, said time interval regulation being accomplished by simultaneously decreasing the rate of disengagement of the second servo and increasing the rate of engagement of the first servo under certain driving conditions and by increasing the rate of disengagement of the second servo while simultaneously decreasing the rate of engagement of the first servo under other driving conditions.

It is a further object of my invention to provide a control system of the type above set forth and which may be currently adapted to be used with a variety of automatic transmissions of known construction.

For the purpose of more particularly describing the principal features of my invention, reference may be made to the accompanying drawings wherein:

FIGURE 1 shows a schematic representation of a multiple speed, power transmission capable of incorporating an automatic control system embodying the improvement of my instant invention;

FIGURE 2 is a schematic representation of a portion of a control circuit for the transmission in FIGURE 1 and it includes the principal features of the improvement of my instant invention; and FIGURE 3 is an enlarged view of portions of the schematic drawing of FIGURE 2.

Referring first to FIGURE 1, the numeral 10 is used to designate the engine crankshaft of a vehicle engine adapted to be used with the transmission and it is drivably coupled to the carrier 12 of a forward planetary gear unit 14 by means of a drive member 16. The planetary gear unit 14 includes a sun gear 18 and a ring gear 20, the former being adapted to be braked by means of a friction brake band 22. The sun gear 18 may be drivably coupled to the power input gear of a front gear pump 24, said pump forming a portion of the control circuit later to be described.

Ring gear 20 is situated in driving relationship with respect to a pump member 26 of a hydrokinetic torque converter unit 28, said torque converter unit further including a turbine member 30 and a bladed stator 32.

The pump 26 is in turn drivably connected to the drive member 16 through a one-way clutch 34, the latter being adapted to accommodate a transfer of power from the engine crankshaft 10 to the torque converter pump 26 in one direction only. A torque converter stator 32 is anchored to the housing by means of a stationary sleeve shaft 36, a suitable one-way reaction brake 38 being provided to permit an overspeeding of stator 32 during the coupling range of the converter.

The sun gear 18 of the forward planetary unit 14 is adapted to be clutched to the carrier 12 by means of a fluid pressure operated clutch 40. The clutch 40 may be operated alternately with respect to the brake band 22 and its function will be subsequently set forth in a statement of the operation of the invention.

The turbine member 30 is drivably coupled to the central power shaft 42 which in turn is connected to a sun gear 44 of a rearwardly situated compounded planetary gear unit 46. The unit 46 further includes a carrier member 48 on which are rotatably mounted first planet pinions 50 and cooperating planet pinions 52. The latter pinions are in driving relationship with respect to an annulus gear 54 which in turn is adapted to be braked by a brake band 56. The pinions 52 are in driving engagement with a second sun gear 58 which may in turn be selectively braked by a brake band 60 or clutched to the power shaft 42 and to the sun gear 44 by means of clutch assembly 62. The carrier 48 is connected to a power output shaft 64. A second gear pump 66 is drivably coupled to the power output shaft 64 and it forms a portion of the control system later to be described.

During operation any one of three speed reduction ratios may be obtained by appropriately energizing the various clutches and brakes. To obtain a low speed, high torque multiplication ratio, brake band 60 may be applied to brake sun gear 58. Power will then be delivered from engine crankshaft 10 through drive member 16 and through one-way clutch 20 into pump member 26. Fluid circulation is then established in the torque converter 28 thereby driving turbine member 30 which in turn drives sun gear 44. Planet pinions 50 and 52 are interengaged with each other and are caused to rotate about the axis of shaft 42 since the sun gear 58 is held stationary. The planetary carrier 48 is thus powered at a substantially high torque multiplication ratio thus powering the power output shaft 64. In one operating embodiment the torque multiplication ratio for low speed operation is 1.82 times the torque ratio obtained in the converter 28.

The clutch 40 may be engaged during low speed operation in order to accommodate a reverse torque reaction through the front planetary unit. However, it does not form a part of the power delivery train since all of the driving torque is taken through the one-way clutch 34.

To obtain second or intermediate speed operation, brake band 60 may be released and clutch 62 may be engaged thus locking sun gear 58 with sun gear 44. This produces a locked-up condition and causes the elements of the rear planetary unit 46 to rotate in unison to effect a 1:1 driving ratio therethrough. The total torque multiplication for the transmission is thus equal to the torque ratio obtained in the converter 28. Clutch 40 may remain energized during second speed operation and it does not affect the power delivery path except under conditions which would produce a reverse torque reaction.

Third speed operation is an overdrive and is obtained by maintaining the clutch 62 in an engaged condition and simultaneously engaging brake band 60 thereby anchoring sun gear 14. Ring gear 20 is thus overspeeded with respect to driving member 16 thereby overspeeding pump member 26 of the converter unit 28 with respect to the engine drive shaft 10. In one operating embodiment of the invention the overspeeding ratio is .7:1 and the over-all torque multiplication ratio is thus .70 times the torque multiplication obtained in the torque converter 28.

The one-way clutch 34 permits this overspeeding to take place and it does not form a portion of the power delivery train under these conditions. The clutch 40 is, of course, released prior to the application of the brake 22.

To obtain reverse drive, brake band 56 may be applied and clutch 40 may again be energized for the reasons previously pointed out. Power will then be delivered through the torque converter 28 and through the power shaft 42 to the sun gear 44. Since the ring gear 54 now serves as a reaction member, the intermeshed planetary gears 50 and 52 will rotate about the axis of shaft 52 to drive the carrier 48 and output shaft 64 in a reverse direction.

Referring next to FIGURE 2, I have schematically illustrated a portion of the automatic controls for regulating the operation of the clutches and brakes of the transmission mechanism of FIGURE 1, the fluid pressure operated servo for energizing clutch 62 being generally designated by numeral 68 and the fluid pressure operated servo for energizing low speed brake band 60 being illustrated at 70. Fluid pressure from the engine driven front pump 24 is transmitted to the system through a conduit shown in part at 72 and it communicates with the discharge side of the tail shaft driven rear pump 66 by means of a conduit 74, a suitable check valve 76 being interposed between the respective discharge sides of the pumps 24 and 66 as indicated. A branch conduit 78 is provided on the front pump side of the check valve 76 for the purpose of supplying control pressure to a manual valve, not shown, which in turn selectively distributes fluid pressure to various portions of the circuit to condition the transmission for the various forward drive ranges, for reverse, and for neutral. It is thus apparent that the rear pump 66 will distribute fluid pressure to the circuit whenever the discharge pressure thereof exceeds the discharge pressure of the front pump 24 and the front pump is effective to supply the fluid circuit when the discharge pressure thereof exceeds that of the rear pump 66. The low pressure intake side of the pump 66 communicates with the low pressure sump of the control system by means of a conduit 80.

A transmission low to intermediate shift valve is illustrated in FIGURE 2 at 82 and it comprises multiple valve lands formed on a single valve spool. Control pressure is distributed to shift valve 82 through a conduit 84 extending from the aforementioned manual valve. If it is assumed that the manual valve is shifted into a forward drive range, control pressure will be transferred from conduit 84 to passage 86, the shift valve 82 providing communication between the passages 84 and 86 when it assumes the position shown in FIGURE 2. Free communication is provided by shift valve 82 by means of an annular groove defined by adjacent valve lands 88 and 90. Conduit 86 extends to fluid pressure operated servo 68 to energize the same and to condition the transmission for direct drive, intermediate speed operation. Simultaneously, fluid pressure is transferred from conduit 86 through a check valve 92 into a conduit 94 which extends to the release side of fluid pressure operated servo 70 thereby de-energizing the brake band 60. It is thus apparent that when the shift valve 82 assumes the position shown, and if control pressure is made available to conduit 84 by the manual valve, the front clutch will be applied and the brake band 60 will be released and the transmission will operate in intermediate speed.

A branch conduit 96 communicates with the discharge side of the rear pump 66 and transfers rear pump pressure to a tail shaft driven governor mechanism illustrated schematically at 97. This governor mechanism is capable of producing a vehicle speed pressure signal which may be transmitted to governor pressure conduit 98, the latter communicating with one end of the shift valve 82. The valve 82 includes a land 100 which is subjected to governor pressure for urging the valve spool in a left hand direction, as viewed in FIGURE 2, against the opposing force of a valve spring 102. The force of the spring 102 is supplemented by a pressure force acting on the area between lands 104 and 88, the pressure utilized for this purpose being an engine torque demand responsive pressure such as the pressure produced by a transmission throttle valve shown schematically at 105. This valve 105 is actuated by a linkage connecting the same to an operator controlled accelerator pedal 107 used for moving the vehicle engine throttle. This torque sensitive pressure is commonly referred to by persons skilled in the automatic transmission art as the throttle pressure and it is delivered to the shift valve 82 through a throttle pressure conduit 106. An auxiliary passage 108 also communicates with shift valve 82 and it is adapted to supply line pressure to the shift valve 82 under certain special operating conditions to effect a kickdown from intermediate speed ratio to low speed, high torque multiplication ratio, the particular mechanism employed for producing such a kickdown pressure in the conduit 108 being omitted from the schematic diagram of FIGURE 2. It is apparent from inspection of FIGURE 2 that the kickdown pressure in conduit 108 is capable of acting on the left-hand portion 110 of the shift valve spool.

If it is assumed that the force acting in a right-hand direction as viewed in FIGURE 2 exceeds the balancing force produced by the governor pressure in conduit 98, the shift valve 82 will assume a right-hand position and the transfer of control pressure from conduit 84 to conduit 86 will be interrupted or blocked by valve land 88 of the shift valve 82. Simultaneously, conduit 86 will be exhausted through an exhaust port 116, a suitable precalibrated restriction 118 being provided ahead of the exhaust port 116 for purposes which will later become apparent. The clutch servo 68 will thus become exhausted and de-energized thereby releasing clutch 62. Simultaneously with the release of the clutch 62, fluid pressure is exhausted from the release side of the fluid pressure operated servo 70 for brake band 60 thereby allowing the fluid pressure on the apply side of the brake servo 70 to energize the band 60. The pressurized fluid exhausted from the release side of the servo 70 is prevented from passing directly from conduit 94 into conduit 86 by check valve 92. Instead, the fluid passes from the release side of the servo 70 through conduit 94 and through a coast downshift control valve 120. A branch passage 122 extends from conduit 94 and it is defined in part by a groove formed by spaced valve lands 124 and 126 on the coast downshift control valve 120. Branch passage 122 communicates with the aforementioned passage 86 by means of another branch passage 129. After the release side of the servo 70 is exhausted and after the clutch servo 68 is de-energized the transmission is conditioned for low speed operation.

The exhaust passage for the servo 70 is defined in part by the aforementioned coast downshift control valve 120 and by a forced downshift control valve 128. Referring first to the coast downshift control valve 120 in more particular detail, it is essentially comprised of a valve spool situated within a cooperating valve chamber and urged in a left-hand direction, as viewed in FIGURE 2, by a valve spring 130. In addition to lands 124 and 126, valve 120 includes a land 132 having a diameter somewhat larger than the diameter of adjacent valve land 126. The differential area produced by the lands 126 and 132 is subjected to line pressure by means of passages 134 and 136. I contemplate that the control system will include a pressure regulator valve for varying the effective pump pressure supplied by the pumps 24 and 66 in response to torque demands, a higher torque demand being accompanied by an increase in the operating level of the line pressure. It is thus seen that when the vehicle is coasting with a closed engine throttle, the line pressure will be reduced to a minimum and the downshift control valve 120 will assume a left-hand position as viewed in FIGURE 2 under the influence of the spring 130. Branch conduit 122 will thus be blocked by land 126 and communication between conduit 94 and bypass conduit 98 will thereafter take place through a precalibrated restriction shown at 138. When a downshift occurs under such conditions the presence of restriction 138 in the discharge passage for the release side of brake servo 70 will decrease the rate at which brake band 60 becomes engaged. This increased time interval will correspond to the increased time necessary to disengage clutch 62. As soon as the coasting operation is complete, the engine throttle is advanced and line pressure will again increase thereby causing the coast downshift control valve 120 to shift to a right-hand position thereby conditioning the mechanism for a subsequent downshift under torque, the latter being commonly referred to as a forced downshift.

The forced downshift control valve 128 is situated on the downstream side of the coast downshift control valve 120 and it comprises a pair of valve lands 140 and 142 slidably situated in a cooperating valve chamber. The bypass conduit 129 is formed with a pair of flow control orifices 144 and 146 situated in series and one end of the forced downshift control valve chamber communicates with bypass conduit 129 on the upstream side of the orifices 144 and 146. The forced downshift control valve is urged in a right-hand direction by a suitable calibrated valve spring 148 and it is adapted to progressively restrict the bypass conduit 129 as indicated, the portion of the bypass conduit on which the valve land 142 acts being situated in parallel relationship with respect to precalibrated orifice 146. The valve lands 140 and 142 are formed with a differential area which is subjected to governor pressure from conduit 98, said governor pressure producing a pressure force which supplements the force of valve biasing spring 148. Although the fluid pressure which exists on the downstream side of orifice 144 during a downshift is less than the pressure on the upstream side, the valve 120 is urged in a leftward direction by reason of the differential in the diameter of the lands 140 and 142. This valve arrangement provides uniform regulation regardless of oil temperature and the characteristics of the orifice 144 are not dependent upon viscosity, the orifice 144 preferably being formed in a thin plate situated in the fluid passage. The regulation provided by valve 128 will be progressive in character down to the limiting flow established by the orifice 146.

It is apparent that at high vehicle speeds the degree of restriction offered by the forced downshift control valve 128 will be higher than the corresponding restriction at lower vehicle speeds. It, therefore, follows that the time required to energize the low speed brake band 60 will progressively increase during a shift sequence if the vehicle speed increases, the actual change in engine speed being greater during a downshift at high vehicle speeds than during a downshift at low vehicle speeds.

It is emphasized that the servo 60 and the release side of the brake servo 70 must both be simultaneously exhausted through precalibrated exhaust orifice 118 during a downshift. If the downshift occurs at a relatively high vehicle speed the exhaust passage for the servo 70 will be blocked and the flow requirements of the orifice 118 are reduced thereby permitting the clutch servo 68 to become de-energized at a relatively high rate. However, if this downshift occurs at a low vehicle speed the degree of restriction in exhaust passage for the brake servo 70 is substantially reduced and the orifice 118 must accommodate a greater flow during a given time interval. This creates a back pressure in conduit 86 thus maintaining the clutch servo 68 energized for a longer period of time. This delay in the release of the clutch 62 prevents the engine from "running away" during a downshift and it holds the transmission in the intermediate drive range until the brake servo 70 has been fully energized.

The metering characteristics of the orifice 118, 146 and 144 and the flow regulating characteristics of the forced downshift control valve 128 may be matched with the capacities of the clutch and brake servos so that the brake band 60 and clutch 62 will be sequentially energized or de-energized in proper timed relationship at all vehicle speeds regardless of torque demands.

For the purpose of describing the fluid pressure governor, it is pointed out that the governor assembly includes a governor valve element adapted to control the degree of communication between a control pressure passage and a governor pressure passage, said governor valve element having a differential area over which the governor pressure is caused to act, thereby opposing an oppositely directed centrifugal force. When the vehicle speed increases, the valve element is urged outwardly under the resulting increased centrifugal force thereby tending to increase the degree of communication between the control pressure passage and the governor pressure passage thereby increasing the effective governor pressure. The variation in governor pressure will therefore be a function of vehicle speed.

Throttle valve 105 may comprise a valve spool capable of controlling communication between a control pressure passage and a throttle pressure passage, both of which communicate with a throttle valve chamber. A throttle valve spring is mechanically connected to the vehicle engine throttle so that when the vehicle engine throttle is adjusted to an advanced setting the throttle valve spring will be compressed thereby urging the throttle valve spool in a right-hand direction to increase the degree of communication between the control pressure passage and the throttle pressure passage thereby increasing the magnitude of the throttle pressure passage, the latter being an indicator of engine torque demand. A differential area is provided on the throttle valve spool on which the throttle pressure is caused to act, and the resulting throttle pressure force opposes and balances the force of the throttle valve spring.

As previously indicated, throttle pressure is transmitted to one end of the shift valve for providing a shift valve biasing force. If desired, a throttle pressure modulator valve, not specifically illustrated, may be situated in combination with the shift valve and the throttle valve, but the actual force acting on the shift valve is a function of engine throttle setting regardless of whether throttle pressure acts directly on the shift valve or modulated pressure acts on the same.

The throttle pressure in the disclosed circuit arrangement is caused to pass through a throttle pressure limiting valve and the resulting modulated throttle pressure is caused to act on one end of a valve spool in a compensator valve assembly shown at 150. Governor pressure is caused to act on the other end of the compensator valve assembly and the force produced by the modulated throttle pressure and by the governor pressure controls the operation of the compensator valve spool. This valve spool in turn regulates the degree of communication between the associated line pressure passage and the compensator pressure passage. The compensator pressure passage in turn communicates with a main control pressure regulator valve shown at 152, the latter comprising a valve spool having a differential area on which the compensator pressure is caused to act. The regulator valve spool also includes valve lands capable of controlling the degree of communication between the discharge side of the transmission pumps and the sump, and this in turn provides the necessary pressure regulation. The valve operating forces are obtained by means of a valve spring and by means of a differential area on which the control pressure is caused to act so that the resulting forces acting on the valve spool will be balanced. It is thus apparent that when the compensator pressure is high the degree of communication between the associated control pressure passage and the sump is increased, and the control pressure is accordingly reduced. Conversely, when the compensator pressure is reduced, the net force opposing the control pressure biasing force will be reduced and the control pressure will correspondingly increase. It is thus apparent that an increase in engine throttle setting will increase the throttle pressure and this in turn will cause a decrease in the effective compensator pressure and an increase in the control pressure. It is thus seen that the control pressure will be determined by the engine torque demand.

For the purpose of summarizing the function of the improved circuit herein disclosed, the following statement of the operation of the control circuit is set forth.

It is contemplated that the transmission may be caused to downshift from a relatively high speed ratio to a lower speed ratio and this necessitates a disengagement of the clutch and a synchronized engagement of the brake. Such a downshift may occur when the engine throttle is fully closed or it may occur by quickly advancing the engine throttle setting after continued operation under stabilized conditions. The former type of downshift can be referred to as a coasting downshift or a zero throttle downshift and it will occur when the vehicle is caused to coast with the engine throttle in a fully closed position after the vehicle speed becomes sufficiently reduced during the coasting operation. The governor pressure acting on the right side of the shift valve will no longer be sufficient to maintain the shift valve in the position shown in FIGURE 2 and the shift valve will become shifted under the influence of spring pressure in a rightward direction.

By way of contrast, when the downshift occurs while the engine is under torque, the shift sequence is referred to as a forced downshift and under these conditions the shift valve 82 is urged in a rightward direction by reason of the sudden increase in throttle pressure acting on the left side of the shift valve. The throttle pressure is so increased by reason of the fact that a sudden engine throttle opening will be coincident with an increased torque demand and, as previously mentioned, the throttle pressure is therefore torque demand responsive. The resulting increase in the ratio of the throttle pressure force to the governor pressure force will effect the required shifting movement of shift valve 82.

If it is assumed that the shift valve 82 is moved to the rightward or downshift position, conduit 86 is brought into direct communication with exhaust port 116, and the fluid pressure operated clutch and the release side of the brake servo are both simultaneously exhausted through conduit 86 and port 116. However, the exhaust path followed by the fluid which is exhausted from the release side of the brake servo 70 is defined by the conduit 94, branch passages 122 and 129, conduit 86 and exhaust port 116. It is important to note that the path followed by the fluid when it is transferred to the release side of the brake servo 70 is different than the path followed by the same fluid when it is exhausted during a downshift. For example, during an upshift from a low speed ratio to a higher speed ratio, the shift valve is moved in the leftward direction and the pressurized fluid will pass directly from conduit 84 to conduit 86, and a major portion of this fluid will pass through check valve 92 to conduit 94 which extends directly to the release side of the brake servo.

For purposes of illustration, let it be assumed that the transmission undergoes a zero throttle downshift. This results in a decrease in throttle pressure as previously mentioned and this in turn results in a decreased line pressure or control pressure by reason of the operation of a regulator valve means which will subsequently be described. Since valve land 132 of the downshift valve 128 is larger than the associated valve land 126, the downshift valve will be urged in a righthand direction whenever the engine is under torque, but it will be urged in a leftward direction under spring pressure whenever the engine throttle is moved to a closed position. As soon as the coasting operation begins, the downshift valve 120 will therefore be shifted in this fashion, thereby blocking bypass passage 122 so that the fluid which is exhausted from the release side of the brake servo must pass through orifice 138, the check valve 92 preventing communication between conduit 94 and conduit 86 under these conditions. This retards the rate of flow of fluid from the release side of the brake servo and accordingly delays the application of the brake and effects a cushioned engagement of the same. By way of contrast, the clutch is exhausted rather quickly through the exhaust port 116 in the shift valve chamber.

For purposes of describing a forced downshift, let it be assumed that the engine throttle is opened to its maximum setting thereby causing the shift valve 82 to move to the right under the influence of increased throttle pressure following steady state operation in a higher speed ratio. The clutch will be exhausted as before through conduit 86 and exhaust port 116 in the shift valve chamber. However, the release side of the brake servo will be exhausted through conduit 94 and through bypass passage 122, the latter being fully open since the downshift valve 120 will be urged in a rightward direction under the influence of the increased line pressure acting thereon. Passage 122 in turn communicates with passage 129 through the forced downshift valve chamber, and passage 129 in turn communicates with conduit 86 and the aforementioned exhaust port 116. This flow path is progressively restricted by the forced downshift valve as the forced downshift valve is moved in a rightward direction. The forced downshift valve is subjected to governor pressure which tends to urge the same toward a passage restricting position, and this force is opposed by the valve actuating force produced by the pressure differential across orifice 144.

When a forced downshift occurs at high vehicle speeds, the actual change in engine r.p.m. is greater than when a downshift occurs at lower vehicle speeds. It is therefore necessary to provide a greater delay in the application of the brake at high vehicle speeds than at low vehicle speeds since the engine will require more time to accelerate to the necessary increased r.p.m. This variation in the shift timing is obtained by the forced downshift valve 128 since the valve land 142 will provide a higher degree of restriction in the exhaust passage for the release side of the brake servo when the governor pressure is at a relatively high value.

It is also emphasized that both the clutch and the release side of the brake servo are exhausted through the common exhaust port 116. Since this is the case, the back pressure produced by the orifice or restriction 118 in the exhaust port 116 tends to maintain the clutch in engagement following movement of the shift valve 82 to a downshift position. If a forced downshift occurs at a relatively high vehicle speed, the rate at which the release side of the brake servo is exhausted will be reduced as above explained and it therefore follows that the flow requirements of the orifice 118 are correspondingly reduced. This results in a reduced back pressure at the orifice 118 and the clutch will become disengaged in a correspondingly reduced time interval. It is thus seen that a forced downshift at high speeds is accompanied by a delayed application of the brake and an increase in the rate of disengagement of the clutch. Both of these factors contribute to an increased time interval between the instant the clutch becomes disengaged and the instant the brake becomes fully engaged. Conversely, these two factors work in a somewhat opposite fashion during a forced downshift at low vehicle speeds. As previously indicated, the degree of restriction provided by the forced downshift valve 128 during a forced downshift at low vehicle speeds is relatively reduced, and consequently the rate at which fluid is exhausted from the release side of the brake servo is correspondingly increased. The flow requirements of the exhaust port 116 are therefore increased and the back pressure produced by the orifice 118 is increased. This back pressure is sensed by the clutch and it tends to maintain the clutch in engagement for a relatively longer period of time following the initiation of a shifting movement of the shift valve. It is thus seen that the time lag between the instant the downshift is initiated and the instant the clutch becomes fully disengaged is increased and the corresponding time lag required to complete the engagement of the brake is decreased. Both of these factors contribute to a decreased time interval between the disengagement of the clutch and the application of the brake. This is desirable since the actual change in engine r.p.m. required during a downshift at lower vehicle speed is less than the corresponding speed change during a downshift at high vehicle speeds.

Although I have particularly described a preferred embodiment of my invention I contemplate that variations thereto may be made by persons skilled in the art and that it may be readily applied to transmissions other than the specific type herein disclosed without departing from the scope of my invention as defined by the following claims.

I claim:

1. In an automatic control system, a pair of fluid pressure operated servo mechanisms, a fluid pressure source, fluid pressure conduit structure interconnecting said pressure source and said servo mechanisms, shift valve means located in a first portion of said conduit structure for controlling the distribution of fluid pressure from said pressure source to each of said servo mechanisms thereby alternately actuating the latter, a valve mechanism situated in and partly defining a second portion of the conduit structure extending to one of said servo mechanisms, said valve mechanism including a flow restricting orifice and a metering valve element, the latter being adapted to variably restrict said second portion, and means for subjecting opposed portions of said metering valve element to the pressure differential across said orifice thereby actuating said valve element to effect a controlled rate of response of said one servo mechanism following a shifting movement of said shift valve, a valve chamber, said valve element being received in said valve chamber, a valve port communicating with said valve chamber and defining in part said second portion of the conduit structure, said valve element registering with said port and being movable over the same under the influence of the pressure differential across said orifice toward a second conduit structure portion closing position.

2. In a control system for an automatic, power transmission mechanism having power delivery gears, said gears providing two alternate power delivery paths between a driving member and a driven member, first and second fluid pressure operated servo mechanisms adapted to condition said gears for torque delivery through one and the other power flow path respectively, a fluid pressure source, fluid pressure conduit structure interconnecting said pressure source and said servo mechanisms, a shift valve means in said fluid pressure conduit structure for selectively distributing fluid pressure to each of said servo mechanisms and for alternately exhausting fluid pressure from the same, means for subjecting said shift valve means to control pressure signals that are proportional in magnitude to separate operating variables, and a downshift control valve means located in a portion of said conduit structure extending to said first servo mechanism for controlling the rate of flow of fluid through the same from said first servo mechanism to an exhaust region when said first servo mechanism is actuated, said valve means including a movable valve element, a fluid pressure control area formed on said valve element and means for subjecting said control area to a fluid pressure signal, the latter being functionally related in magnitude to one of said operating variables.

3. In a control system for an automatic, power transmission mechanism having power delivery gears, said gears providing two alternate power delivery paths through a driving member and a driven member, one path producing a relatively high torque multiplication, first and second fluid pressure operated servo mechanisms adapted to condition said gears for torque delivery through said one and the other power flow path respectively, a fluid pressure source, fluid pressure conduit structure interconnecting said pressure source and said servo mechanisms including a separate portion extending to said first servo mechanism, a shift valve means in said fluid pressure conduit structure for selectively distributing fluid pressure to each of said servo mechanisms and for alternately exhausting fluid pressure from the same, a downshift control valve means located in one of said separate portions of said conduit structure for controlling the rate of flow of fluid under pressure through the same from said first servo to an exhaust region, said downshift control valve means comprising a movable valve element adapted to progressively restrict said last named portion of said conduit structure, the latter including a precalibrated orifice and means for subjecting said valve element to the pressure differential existing across said orifice, and a one-way check valve means in the other of said separate portions for accommodating free distribution of fluid pressure therethrough, and for inhibiting fluid flow therethrough in the opposite direction.

4. In a control system for an automatic, power transmission mechanism having power delivery gears, said gears providing two alternate power delivery paths through a driving member and a driven member, one path producing a relatively high torque multiplication, first and second fluid pressure operated servo mechanisms adapted to condition said gears for torque delivery through said one and the other power flow paths respectively, a fluid pressure source, fluid pressure conduit structure interconnecting said pressure source and said servo mechanisms, a shift valve means in said fluid pressure conduit structure for selectively distributing fluid pressure to each of said servo mechanisms and for alternately exhausting fluid pressure from the same, and a downshift control valve means located in a portion of said conduit structure extending to said first servo mechanism and adapted to control the rate of flow of fluid under pressure through the same, said downshift control valve means comprising a movable valve element adapted to progressively restrict said last named portion of said conduit structure, the latter including a precalibrated orifice and means for subjecting said valve element to the pressure differential existing across said orifice, and driven shaft speed sensitive means for biasing said valve element toward a conduit structure restricting position and for varying the rate of response of said other servo mechanism to a shifting movement of said shift valve means, said rate of response thereby being determined by the speed of said driven member.

5. In a control system for an automatic, power transmission mechanism having power delivery gears, said gears providing two alternate power flow paths between a driving member and a driven member, one path producing a relatively high torque multiplication, first and second pressure operated servo mechanisms adapated to condition the gears for torque delivery through said one and said other power flow path respectively, a fluid pressure source, a fluid pressure conduit communicating with said pressure source and including branch portions extending to each of said servo mechanisms, a shift valve located in said conduit, said shift valve including a valve element adapted to alternately connect said conduit to each branch portion and to exhaust the same, a downshift control valve situated in and partly defining one of said branch portions and including a valve element adapted to progressively restrict the same, and speed governor means for urging said valve element toward a conduit restricting position thereby varying the rate of response of said servo mechanisms to a shifting movement of said shift valve, said rate of response being determined by the magnitude of the driven speed of said driven member.

6. In a control system for an automatic, power transmission mechanism having power delivery gears, said gears providing two alternate power flow paths between a driving member and a driven member, one path producing a relatively high torque multiplication, first and second pressure operated servo mechanisms adapted to condition the gears for torque delivery through one and said other power flow paths respectively, a fluid pressure source, a fluid pressure conduit communicating with said pressure source and including branch portions extending to each of said servo mechanisms, a shift valve located in said conduit, said shift valve including a valve element adapted to alternately connect said conduit to each branch portion and to exhaust the same, a downshift control valve situated in and partly defining one of said branch portions and including a flow control valve element adapted to progressively restrict the flow of fluid from one of said servo mechanisms to an exhaust region, speed governor means for urging said flow control valve element toward a passage closing position thereby progressively varying the rate of response of said servo mechanisms to a shifting movement of said valve means, said rate of response being determined by the magnitude of the driven speed of said driven member, and a bypass passage situated in parallel relationship with respect to part of said one branch portion, said bypass passage being adapted to transfer fluid pressure from the region of said shift valve means to said one servo mechanism independently of said downshift control valve.

7. The combination as set forth in claim 6 wherein said branch passage includes a one-way check valve adapted to direct fluid pressure to said one servo mechanism while preventing the transfer of pressurized fluid through said bypass passage in a reverse direction.

8. In a control system for an automatic, power transmission having at least two geared power flow paths, each path providing a separate torque multiplication ratio, first and second fluid pressure operated servo mechanisms adapted to respectively actuate said power flow paths, the second servo mechanism including opposed apply and release working chambers, said second servo mechanism being energized when one of said chambers is pressurized and being de-energized when both of said chambers are pressurized, a fluid pressure source, a fluid pressure conduit connecting said servo mechanisms with said pressure source including a first portion common to each servo mechanism and separate branch portions extending from said first portion to said first servo and to the release side of said second servo respectively, shift valve means in the common conduit portion for alternately pressurizing and exhausting said branch conduit portions, a control valve means situated in the branch portion extending to the release working chamber of said second servo mechanism for regulating the rate of flow of fluid from said second servo mechanism to an exhaust region thus controlling the rate of application of said second servo mechanism following a shifting movement of said shift valve means, said control valve means including a movable valve element adapted to progressively restrict the branch conduit portion associated with said second servo mechanism, a flow restricting orifice located in said last named branch portion, said valve element being subjected to the pressure differential produced across said orifice thereby urging the same, toward a branch conduit portion closing position, and a bypass passage in said last-named branch portion extending around said control valve means, a one-way check valve means in said bypass passage for accommodating free distribution of fluid pressure from said pressure source to said release working chamber and for inhibiting fluid flow through said bypass passage in the opposite direction.

9. In a control system for an automatic, power transmission mechanism having power delivery gears, said gears providing two alternate power flow paths between a driving member and a driven member, one path producing a relatively high torque multiplication, first and second fluid pressure operated servo mechanisms adapted to condition said gears for torque delivery through said one and the other power flow path respectively, said first servo mechanism being double acting and including a pressure movable member with a working chamber situated on each side thereof, said movable member being shifted to a servo de-energizing position one of said working chambers is pressurized, a fluid pressure source, a fluid pressure conduit communicating with said pressure source and including branch portions extending to said first servo mechanism and to said one working chamber of said first servo mechanism, a shift valve means located in said pressure conduit for alternately pressurizing and exhausting said branch portions while exhausting the other, a downshift control valve situated in and partly defining the branch portion extending to said one working chamber for said first servo mechanism and including a valve element adapted to progressively restrict said last named branch portion, a speed governor means for urging said valve element toward a branch conduit portion closing position and a precalibrated orifice formed in and partly defining the branch conduit extending to said one working chamber for said first servo mechanism, and means for subjecting said valve element to a pressure differential produced across said orifice.

10. The combination as set forth in claim 9 wherein said shift valve means includes a common exhaust passage for each of said branch conduit portions and a second precalibrated orifice located in said exhaust passage, said shift valve establishing communication between said branch conduits and said common exhaust passage to de-energize said second servo mechanism while simultaneously energizing said first servo mechanism in timed relationship.

11. In a control system, first and second fluid pressure operated servo mechanisms, a fluid pressure source, conduit structure interconnecting said pressure source with said servo mechanisms including a common fluid pressure passage and a separate branch passage extending to each servo mechanism, a flow control valve including portions situated in and partly defining the branch passage extending to said second servo mechanism, said flow control valve including a movable valve element having spaced circular valve lands of different diameters, one of said lands being adapted to progressively restrict said last named branch passage upon movement of said valve element in one direction, shift valve means for selectively and alternately pressurizing and the exhausting said branch passages, a precalibrated orifice formed in said last named branch passage, one side of the larger of said valve lands being subjected to the fluid pressure on the downstream side of said orifice when fluid pressure is exhausted from said second servo mechanism and an opposed side of the smaller of said valve lands being subjected to the fluid pressure existing on the upstream side of said orifice and means for subjecting the differential area produced by said valve lands to an independent fluid pressure signal thereby altering the characteristics of said flow control valve.

12. The combination as set forth in claim 11 wherein said control valve further includes a valve spring for normally biasing said valve element toward a branch passage closing position.

13. In a control system for an automatic, power transmission mechanism capable of delivering power from an engine to a driven member, said transmission mechanism having power delivery gears providing two alternate power flow paths between a driving member and a driven member, a first and a second pressure operated servo mechanism adapted to condition said gears for torque delivery through said one and said other power flow path respectively, a fluid pressure source, a fluid pressure conduit communicating with said pressure source and including separate branch portions extending to each of said servo mechanisms, a shift valve located in said conduit, said shift valve including a valve element adapted to alternately connect said conduit to each branch portion and for exhausting the same, a first downshift control valve situated in and partly defining one of said branch portions and including a valve element adapted to progressively restrict the same, speed governor means for urging said valve element toward a conduit restricting position thereby progressively varying the rate of response of said servo mechanisms to a shifting movement of said shift valve, said rate of response thereby being determined by the magnitude of the driven speed of said driven member, a second downshift control valve situated in and partly defining said one branch portion and including a valve element adapted to restrict said one branch portion upon movement thereof toward one position and to open said one branch portion upon movement thereof to another position, means for subjecting the valve element for said second downshift control valve to an engine torque demand sensitive signal for urging the latter toward a conduit opening position and spring means for opposing the force established by said torque demand sensitive signal.

14. A flow control valve adapted to be situated in a fluid delivery passage comprising a valve chamber, a movable valve element disposed within said chamber and including valve lands of a differential area, a precalibrated orifice situated in and partly defining said passage, one side of one valve land communicating with said passage on the downstream side of said orifice and a juxtaposed side of the other valve land communicating with said passage on the upstream side of said orifice, a valve port communicating with said valve chamber and defining a part of said passage, said one valve land being adapted to progressively restrict said port upon movement thereof in one direction and means for applying a control signal pressure to said differential area to urge said valve element in said one direction.

15. The combination as set forth in claim 14 wherein said passage further includes a branch passage for bypassing said port, said branch passage including a second flow metering orifice for establishing a limiting flow of fluid through said passage.

References Cited in the file of this patent
UNITED STATES PATENTS

| | | |
|---|---|---|
| 2,376,545 | Livermore | May 22, 1945 |
| 2,740,304 | Sheppard | Apr. 3, 1956 |
| 2,766,639 | Rosenberger | Oct. 16, 1956 |